United States Patent
Tsai

(10) Patent No.: US 6,636,466 B1
(45) Date of Patent: Oct. 21, 2003

(54) METHOD FOR TRACK SEEKING OF A READING HEAD IN AN OPTIC DISK DRIVE

(75) Inventor: Yao-Chou Tsai, Taipei (TW)

(73) Assignee: Lite-On It Corporation, Taipei (TW)

( * ) Notice: Subject to any disclaimer, the term of this patent is extended or adjusted under 35 U.S.C. 154(b) by 425 days.

(21) Appl. No.: 09/679,606

(22) Filed: Oct. 5, 2000

(51) Int. Cl.$^7$ ................................................ G11B 7/00
(52) U.S. Cl. ............................ 369/44.28; 369/30.17; 369/30.14
(58) Field of Search .......................... 369/30.16, 30.04, 369/44.28, 30.13, 30.15, 30.17, 30.14

(56) References Cited

U.S. PATENT DOCUMENTS

| | | | | | |
|---|---|---|---|---|---|
| 4,866,687 | A | * | 9/1989 | Kasai et al. | 369/30.15 |
| 5,121,370 | A | * | 6/1992 | Yanagi | 369/30.15 |
| 5,339,299 | A | * | 8/1994 | Kagami et al. | 369/30.13 |
| 5,394,386 | A | * | 2/1995 | Park et al. | 369/44.28 |
| 5,623,461 | A | * | 4/1997 | Sohmuta | 369/30.17 |
| 5,623,464 | A | * | 4/1997 | Tani | 369/44.28 |
| 5,737,284 | A | * | 4/1998 | Yamada | 369/30.04 |
| 6,349,078 | B1 | * | 2/2002 | Hsu et al. | 369/30.16 |

* cited by examiner

Primary Examiner—William Korzuch
Assistant Examiner—Kim-Kwok Chu
(74) Attorney, Agent, or Firm—Rosenberg, Klein & Lee

(57) ABSTRACT

A method for track seeking of a reading head in an optic disk drive is disclosed. In seeking a track in a disk. the track number and the direction in the fine seek are used for adjusting a voltage waveform in the rough seek. The variation of an optic disk drive due to mechanic friction or torque variation of motor can be overcome so as to achieve the same accuracy as being installed with a speed sensor. Since no speed sensor is required to be installed on the track seeking means, the cost in manufacturing is reduced greatly.

5 Claims, 3 Drawing Sheets

METHOD FOR TRACK SEEKING OF A READING HEAD IN AN OPTIC DISK DRIVE

FIELD OF THE INVENTION

The present invention relates to a method for track seeking of a reading head in an optic disk drive, and especially to a learning track seeking method by which variations of an optic disk drive due to mechanical friction or torque variation of motor can be overcome so as to achieve the same accuracy as that of rough seek with a speed sensor.

BACKGROUND OF THE INVENTION

In the track seeking of an optic disk drive, a laser beam passes through an objective lens to find the track in an optic disk and an optic head serves to track the objective lens.

When any track in the optic disk drive is desired to be tracked, in general, two actions can be performed. (1) An optic head is moved at first to be proximate to the objective track. (2) The objective lens is fine adjusted so that the laser beam attains the objective track. The first action (1) is call as "rough seek", and the second action (2) is called as "fine seek".

In order to achieve the accuracy in the rough seek, a speed sensor is added and a feedback control is used. Since the speed sensor is expensive, it is not suitable in practical.

Further, referring to FIG. 1, a prior art optic disk drive 1 is illustrated. A motor 12 serves to drive a reading head 14 through a gear set of a guide screw rod 13. In seeking, a microprocessor (not shown) sends a control voltage waveform (as shown in FIG. 2) to drive the optic reading head 14 to accelerate to an fixing speed section from a still condition and then decelerate to a still condition.

The designer may determine the number of tracks (acceleration track) for switching to a max speed and then the head move in a fixed speed. In general, the acceleration track makes no problem (for example, increasing seeking time). However, it is difficult to find the number of deceleration track for the head to decelerate and to move along the track as a control voltage is over.

Means with a small friction or a motor with a larger torque will introduce an over rough seek, while means with a large friction or a motor with a small torque will introduce an insufficient rough seek.

Therefore, there is an eager demand for a method for track seeking of a reading head in an optic disk drive, by which the variation of an optic disk drive due to mechanical friction or torque. variation of motor can be overcome so as to achieve the same accuracy.

SUMMARY OF THE INVENTION

Accordingly, the primary object of the present invention is to provide a method for track seeking of a reading head in an optic disk drive, wherein in seeking a track in a disk, the track number and the direction in the fine seek are used for adjusting a voltage waveform in the rough seek. If the direction of fine seek is identical to that in the rough seek, and the number of tracks in fine seek is over a fine seek tolerance, then the number of deceleration tracks is subtracted by a learning gap, i.e., an adaptive number of tracks. If the direction of fine seek is reverse to that of the rough seek, and the number of tracks in fine seek is over a fine seek tolerance, then the number of deceleration tracks is added with a learning gap.

Another object of the present invention is to provide a method for track seeking of a reading head in an optic disk drive, wherein the acceleration track and max speed can be set as learning parameters to optimize.

A further object of the present invention is to provide a method for track seeking of a reading head in an optic disk drive, wherein since no speed sensor is required to be installed on the track seeking means, the cost in manufacturing is reduced greatly.

The various objects and advantages of the present invention will be more readily understood from the following detailed description when reading in conjunction with the appended drawing.

DETAILED DESCRIPTION OF THE PREFERRED EMBODIMENTS

Figure 1:
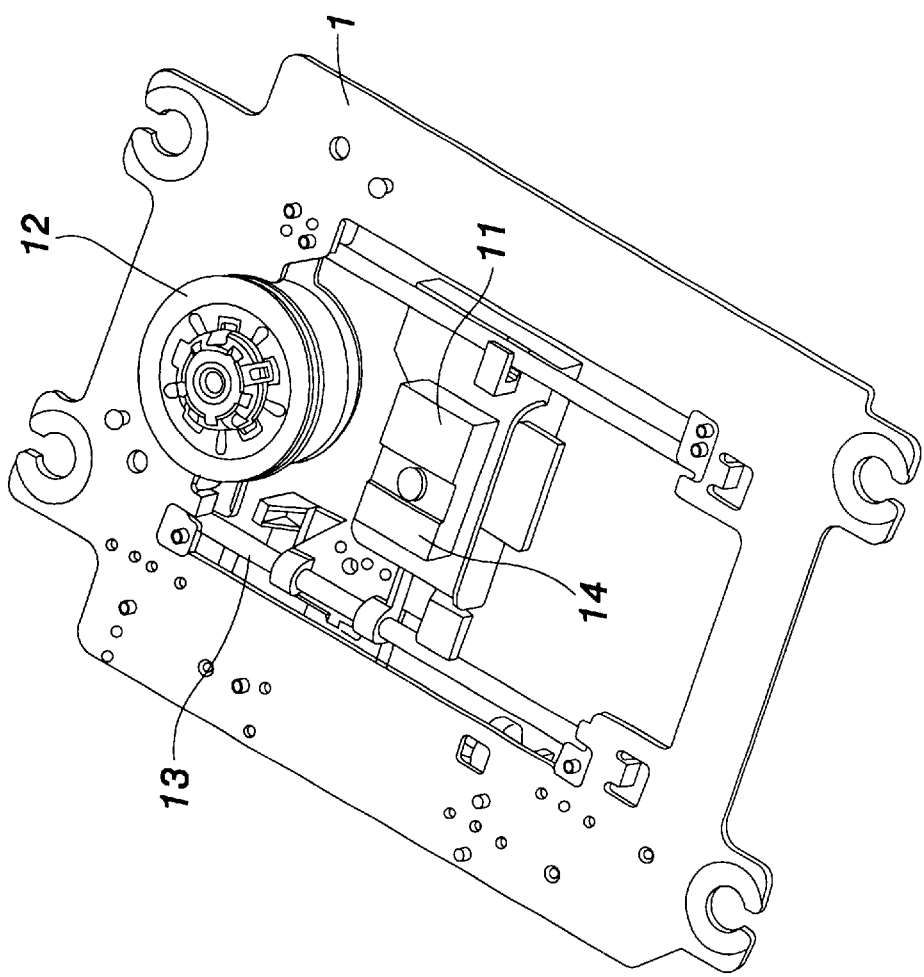
FIG. 1 shows the structure of a prior art optic disk drive.
Figure 2:
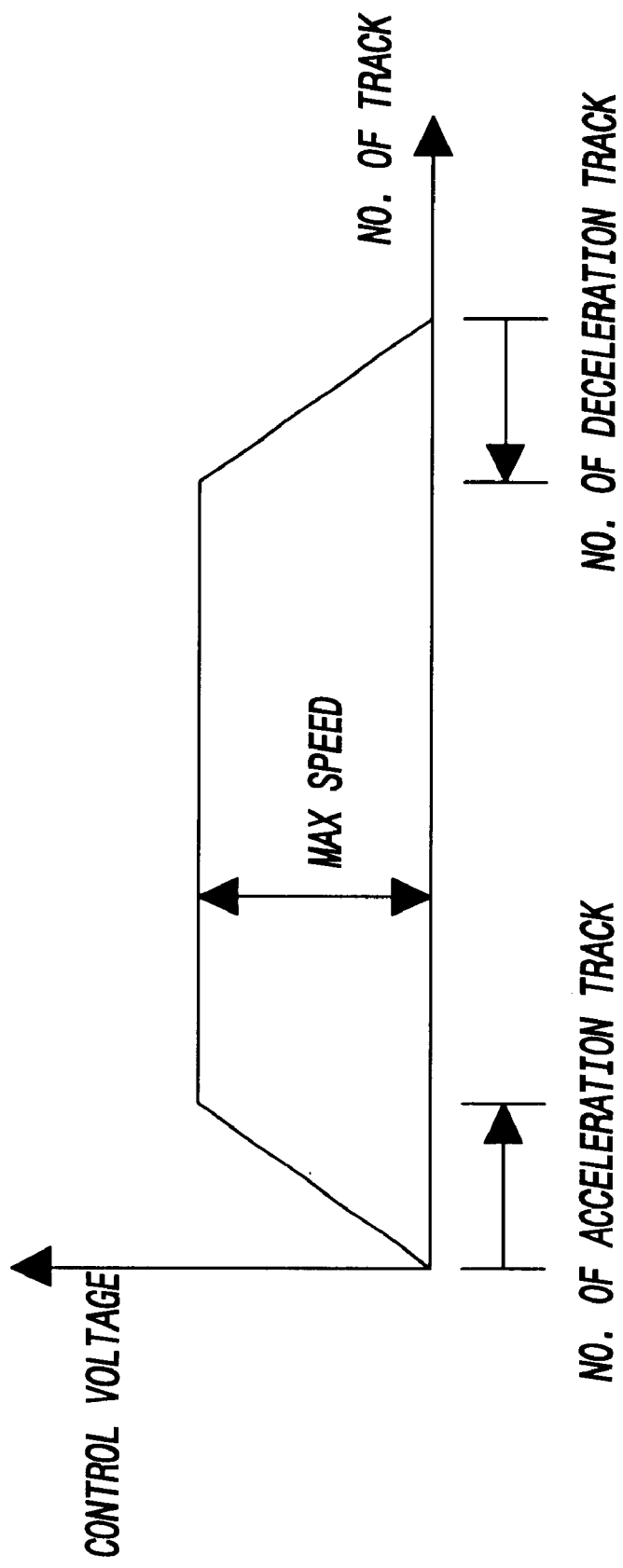
FIG. 2 shows the waveform for the control voltage of the rough seek.
Figure 3:
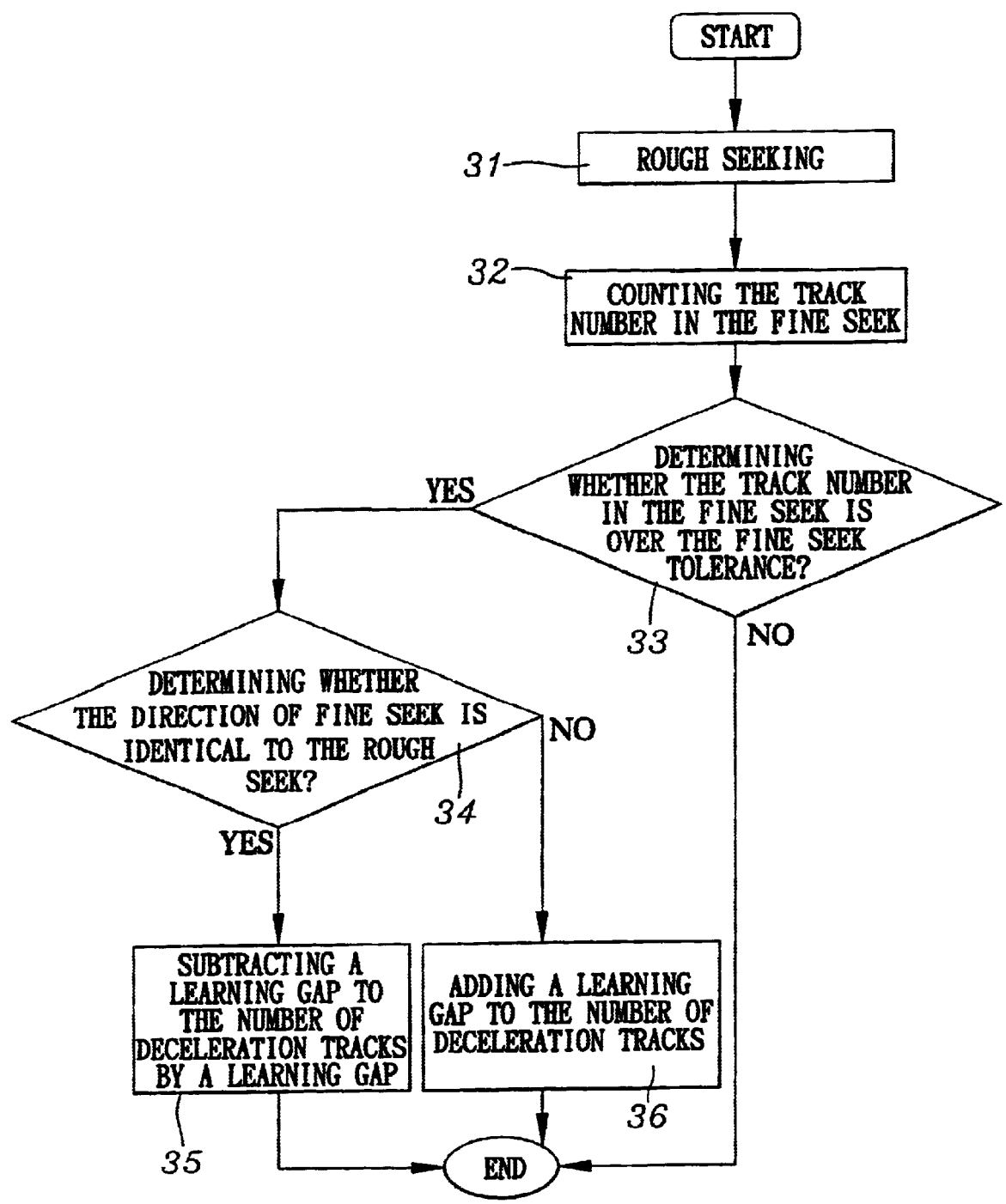
FIG. 3 shows the flow diagram that the track number and the direction in the fine seek.

The present invention relates to a method for track seeking of a reading head in an optic disk drive, wherein when seeking a track in a disk, the track number and direction in the fine seek are determined for adjusting the voltage waveform in the rough seek, as shown in FIG. 3.

Referring to FIG. 3, the method for track seeking of a reading head in an optic disk drive comprises the steps of firstly moving the optic head approximately to a target track (step 31); then count the track number in the fine seek (Step 32), determining whether the number of tracks traversed in the fine seek is over the fine seek tolerance (Step 33).

If the direction in fine seek is identical to that in the rough seek, then the number of deceleration tracks will be subtracted by a learning gap (step 35). The learning gap is a variable number of disk tracks used to adjust the number of tracks over which the deceleration of the rough seek occurs. It is adjusted continually over a number of seeks until the number of tracks traversed by the read head during the fine seek is within a fine seek tolerance.

If the direction in fine seek is reversed to that in the rough seek, then the number of deceleration tracks will be added by a learning gap (step 36).

Therefore, as the read head seeks the track in a disk, the system learns repeatedly until the number of fine seek is within the fine seek tolerance. If temperature is changed so that the number of fine seek is over the fine seek tolerance, the learning action is repeated in the seeking.

In fact, the acceleration track and max speed can be set as learning parameters for optimization.

In summary, the method for track seeking of a reading head in an optic disk drive of the-present invention has the following advantages.

(1) The variation of an optic disk drive due to friction or twisting of motor can be overcome so as to achieve the same accuracy as being installed with a speed sensor.

(2) Since no speed sensor is required to be installed on the track seeking means, the cost in manufacturing is reduced greatly.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for track seeking of a reading head in an optic disk drive, the method comprising the steps of:

seeking a track on a disk via a rough seek;

determining a number of tracks traversed and a direction of travel in a fine seek; and adjusting a voltage waveform in the rough seek when the direction of the fine seek is identical to that in the rough seek, and the number of tracks in the fine seek is over a fine seek tolerance, by subtracting a learning gap from a number of deceleration tracks.

2. The method for track seeking of a reading head in an optic disk drive as claimed in claim 1, wherein learning parameters for adjusting the voltage waveform includes an acceleration track, a max speed, and a deceleration track.

3. A method for track seeking of a reading head in an optic disk drive, the method comprising the steps of:

seeking a track on a disk via a rough seek;

determining a number of tracks traversed and a direction of travel in a fine seek; and adjusting a voltage waveform in the rough seek when the direction of the fine seek is reverse to that in the rough seek, and the number of tracks in the fine seek is over a fine seek tolerance, by adding the learning gap to the number of deceleration tracks.

4. The method for track seeking of a reading head in an optic disk drive as recited in claim 3, wherein learning parameters for adjusting the voltage waveform include an acceleration track, a max speed and a deceleration track.

5. A method for seeking a track with a read head of an optical disk drive, the method comprising the steps of:

(a) initiating a rough seek of the read head to a target track in accordance with a control voltage profile, said control voltage profile including an acceleration region, a constant velocity region and a deceleration region, said deceleration region including an adjustable number of optical disk tracks;

(b) initiating a fine seek upon termination of said rough seek to position the read head at said target track;

(c) determining if a number of tracks traversed in the fine seek is within a predetermined fine seek tolerance;

(d) performing steps (e)–(g) if it is determined in step (c) that said number of tracks traversed is not within said predetermined fine seek tolerance;

(e) determining a direction of travel of the read head during said fine seek;

(f) increasing said adjustable number of tracks in said deceleration region by a learning gap if said direction of travel during said fine seek is equal to a direction of travel of the read head during said rough seek, said learning gap being a variable number of disk tracks adjusted in accordance with said number of tracks traversed in said fine seek; and (g) decreasing said adjustable number of tracks in said deceleration region by said learning gap if said direction of travel during said fine seek is in an opposing direction to said direction of travel of said rough seek.

* * * * *